US005206521A

United States Patent [19]

Ruiz et al.

[11] Patent Number: 5,206,521

[45] Date of Patent: Apr. 27, 1993

[54] ENERGY SAVING OPTOELECTRONIC CODE READING ACCESS DEVICE

[75] Inventors: Gregorio Ruiz, Tlalnepantla; Juan Santarriaga, Atizapan de Zaragoza, both of Mexico

[73] Assignee: Novedades Electronicas Internacionales s.a. de C.V., Mexico City, Mexico

[21] Appl. No.: 681,909

[22] Filed: Apr. 5, 1991

[51] Int. Cl.[5] .................... G06K 7/10

[52] U.S. Cl. .................... 250/569; 235/458

[58] Field of Search .................... 250/569, 222.1, 213 A, 250/214 SW, 555, 556; 235/458, 459, 460; 341/13; 340/600

[56] References Cited

U.S. PATENT DOCUMENTS

| | | | |
|---|---|---|---|
| 3,971,473 | 7/1976 | Ernst, Jr. et al. | 250/569 |
| 4,058,740 | 11/1977 | Dalton et al. . | |
| 4,066,910 | 1/1978 | Swift | 250/569 |
| 4,091,866 | 5/1978 | Curatolo . | |
| 4,101,886 | 7/1978 | Grimes et al. . | |
| 4,107,941 | 8/1978 | Hamilton . | |
| 4,136,820 | 1/1979 | Collado et al. | 250/569 |
| 4,150,415 | 4/1979 | Fichtner . | |
| 4,223,301 | 6/1980 | Grimes et al. . | |
| 4,295,051 | 10/1981 | Graf et al. | 250/569 |
| 4,315,596 | 2/1982 | Johnson, Jr. et al. . | |
| 4,333,604 | 6/1982 | Petrillo | 236/46 R |
| 4,391,406 | 7/1983 | Fried . | |
| 4,719,363 | 1/1988 | Gallacher | 307/117 |

*Primary Examiner*—David C. Nelms
*Assistant Examiner*—K. Shami
*Attorney, Agent, or Firm*—Rosenblatt & Associates

[57] ABSTRACT

An energy saving, optoelectronic system provides a means for energizing and deenergizing electrical loads. The system includes a continuous light transmission source and a light receiving circuit that senses a light pattern and, in response, develops a first or a second output signal. The system also includes a gating circuit that receives the output signal. The gating circuit comprises a logic circuit arranged such that the receiving circuit will transmit the second output signal upon receiving a predetermined light signal. The system further includes a power switch that is open in response to an open circuit signal from the gating circuit and is closed in response to close circuit signal from the gating circuit.

22 Claims, 6 Drawing Sheets

ENERGY SAVING OPTOELECTRONIC CODE READING ACCESS DEVICE

BACKGROUND OF THE INVENTION

1. Field of the Invention

This invention relates to the field of energy saving devices which energize and deenergize the electrical loads in a room or in a building when such loads are not required to be in use. Specifically, the invention relates to an optoelectronic switching device which is actuated by an encoded photoelectric switching card which can be inserted in and removed from a card switching box to energize and deenergize electrical loads responsive to the switching device.

2. Description of the Prior Art

A variety of electronic and electromechanical devices have been used to energize and deenergize the electrical loads in a room or building for energy conservation purposes. Many such devices have been designed for application in the hotel/motel industry where guests have been known to leave rooms unoccupied with the lights and other electrical fixtures or systems left on. Such fixtures or systems may include televisions, radios, and heating, ventilating and air-conditioning (HVAC) systems.

A number of prior art switching devices have been designed to energize and deenergize the electrical loads in a room when a person enters or leaves the room. Many of these devices contain a switching device whose actuation is, in whole or in part, dependent upon the operation of a deadbolt or latch. Such devices are disclosed in U.S. Pat. Nos. 4,580,740 to Dalton et al.; 4,091,866 to Curatolo; 4,391,406 to Fried; and 4,330,604 to Petrillo.

Such deadbolt/latch switching devices have several drawbacks. One drawback is that the electromechanical coupling within the deadbolt/latch device may wear out or malfunction after repeated engagement and disengagement of the latch or deadbolt. Another drawback is that the intended purpose of such systems can be defeated by relatively simple acts, such as stuffing paper or chewing gum in the latch/deadbolt assembly. Another major drawback of deadbolt/latch systems is that in many cases, the room occupant must lock the door after he enters the room. In situations where a room occupant is occupying the room and merely wishes to briefly open his door to look outside or to speak with someone, he must relock the door after it is closed. This can prove to be an annoyance for many room occupants who do not wish to be burdened with relocking their door every time they close it.

Other prior art devices rely upon transmitters and receivers utilizing ultrasonic or radio signals to actuate one or more switches coupled to the energy loads of the room or building. Such devices are disclosed in U.S. Pat. Nos. 4,150,415 to Fichtner; 4,223,301 to Grimes et al.; and 4,101,886 to Grimes et al. The performance of such systems may be adversely affected by stray ultrasonic or radio signals, such as signals from garage door opener transmitters. Also, if a physical object is placed in the room in the path of the ultrasonic or radio signal, such physical object may sufficiently attenuate the signal to adversely affect system operation. Furthermore, the transmission and receiving hardware associated with such systems makes such systems expensive to install and maintain.

SUMMARY OF THE INVENTION

The present invention relates to an energy saving, optoelectronic system for energizing and deenergizing electrical loads which allows the system user to actuate the system by using a specially encoded photoelectric switching card.

The present invention comprises a light transmission source which emits a light signal. In one embodiment, this light transmission source comprises a multiplicity of individual light sources, such as light emitting diodes, arranged in a predetermined geometric pattern. In a preferred embodiment, this light transmission source is a light transmission circuit.

The present invention further comprises a photoelectric receiving circuit placed to receive a light signal in the form of a light emission pattern from the light transmission source. The photoelectric receiving circuit transmits an output signal in response to the particular light signal received from the light transmission source. When no physical object blocks or alters the light signal emitted by the light transmission source, the photoelectric receiving circuit receives an unabbreviated light signal. In response to this unabbreviated light signal, the photoelectric receiving circuit transmits a first output signal.

The invention further comprises a photoelectric switching card which is removably insertable between the light transmission source and the receiving circuit. When the photoelectric switching card is not inserted between the light transmission source and the photoelectric receiving circuit, the photoelectric receiving circuit receives an unabbreviated light signal from the light transmission source. When the photoelectric switching card is inserted between the light transmission source and the photoelectric receiving circuit, the photoelectric receiving circuit receives a predetermined, unique abbreviated light signal from the light transmission source and transmits a second output signal.

The photoelectric switching card comprises a multiplicity of translucent and nontranslucent regions arranged in a predetermined geometric pattern such that when the photoelectric switching card is inserted in a predetermined location between the light transmission source and the photoelectric receiving circuit, the unabbreviated light signal transmitted by the light transmission source is attenuated in a predetermined manner by the photoelectric switching card such that a predetermined, unique abbreviated light signal reaches the photoelectric receiving circuit. In a preferred embodiment, the predetermined, unique abbreviated light signal is a predetermined, abbreviated light emission pattern.

The switching card's predetermined geometric pattern of translucent and nontranslucent regions constitute the means for encoding the switching card. The use of an encoded switching card prevents the present invention from being defeated by inserting a "dummy" card, such as a credit card, between the light transmission source and the receiving circuit.

The invention further comprises a gating circuit coupled to receive output signals from the photoelectric receiving circuit. When the gating circuit receives a first output signal from the photoelectric receiving circuit, the gating circuit transmits an open circuit signal. When the gating circuit receives a second output signal from the photoelectric receiving circuit, the gating circuit transmits a close circuit signal.

In a preferred embodiment, the photoelectric receiving circuit comprises a multiplicity of photoresistors positioned to receive a light signal from one of the light sources which comprises the light transmission source such that each photoresistor emits an open transistor signal when it receives no light from its respective individual light source and each photoresistor emits a close transistor signal when it receives light from its respective individual light source. The photoelectric receiving circuit further comprises a multiplicity of transistors, each of which is coupled to a photoresistor such that the output of each transistor is a logic state 1 in response to an open transistor signal and a logic state 0 in a close transistor signal.

In a preferred embodiment, the gating circuit comprises a multiplicity of gates arranged to receive output signals from each of the transistors such that only one predetermined combination of transistor output signals will cause the gating circuit to transmit a close circuit signal and all remaining combinations of transistor output signals will cause the gating circuit to transmit an open circuit signal.

The light transmission source, photoelectric receiving circuit, and gating circuit are arranged in a preferred embodiment, such that the transistors transmit the predetermined combination of output signals which cause the gating circuit to transmit a close circuit signal, only in response to receipt of the unique, abbreviated light signal by the photoelectric receiving circuit.

The invention further comprises a power switch coupled to the gating circuit such that the power switch is opened in response to an open circuit signal from the gating circuit, and the power switch is closed in response to a close circuit signal from the gating circuit. Some or all of the electrical loads in the room or building may be coupled to the power switch such that they can be energized and deenergized upon actuation and deactuation of the present invention by insertion and removal of the encoded photoelectric switching card.

The present invention further comprises a time delay circuit coupled to the gating circuit such that when the switching card is removed from between the light source and the receiving circuit, the time delay circuit transmits a delay signal to the gating circuit which delays the gating circuit from transmitting an open circuit signal to the power switch for a predetermined time period. This time delay feature allows the occupant of a room or building to remove the switching card from between the light transmission source and the switching circuit and to then have a predetermined time period to leave the room or building before the lights and any other electrical loads connected to the power switch are turned off.

In a preferred embodiment, the light transmission circuit, photoelectric receiving circuit and gating circuit are housed in a card switching box equivalent in size to a conventional wall switch box. A face plate having a card receiving slit through which the photoelectric switching card is removably insertable is mounted on the front of the card switching box.

The card switching box can be conveniently mounted on a wall in the room or building near the entry door. When an occupant enters the room or building, he inserts the photoelectric switching card into the slit in the front of the card switching box and all of the electrical loads coupled to the power switch are energized. When the occupant is ready to leave the room or building, he removes the photoelectric switching card from the card switching box and all of the electrical loads coupled to the power switch are deenergized after a predetermined time period which is set in the time delay circuit.

This invention is particularly useful for guests in a hotel room. The photoelectric switching card may also serve as a key ring for the door to the room or building where the energy saving, optoelectronic system is installed.

DESCRIPTION OF THE PREFERRED EMBODIMENTS

Figure 1A:
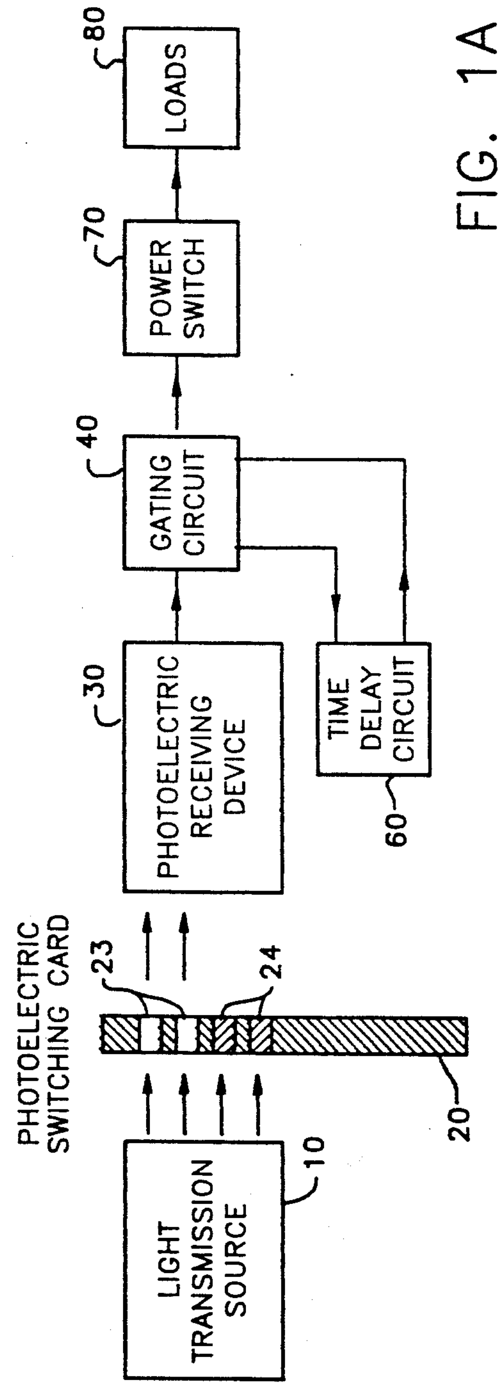
FIGS 1A and 1B are block diagrams of the present invention.

A basic block diagram of the present invention is shown in FIG. 1A. The light transmission source 10 transmits a light emission pattern which is received by the photoelectric receiving circuit 30. The photoelectric switching card 20 comprises a multiplicity of translucent regions 24 and nontranslucent regions 23. The photoelectric switching card 20 is removably insertable between the light transmission source 10 and the photoelectric receiving circuit 30. The gating circuit 40 is coupled to the photoelectric receiving circuit 30. In response to the signal received from the photoelectric receiving circuit 30, the gating circuit 40 transmits an output signal to the power switch 70 which in turn opens or closes to energize or deenergize loads 80. A time delay circuit 60 is actuated by a signal from the gating circuit 40 to transmit a time delay signal to gating circuit 40.

Figure 1B:
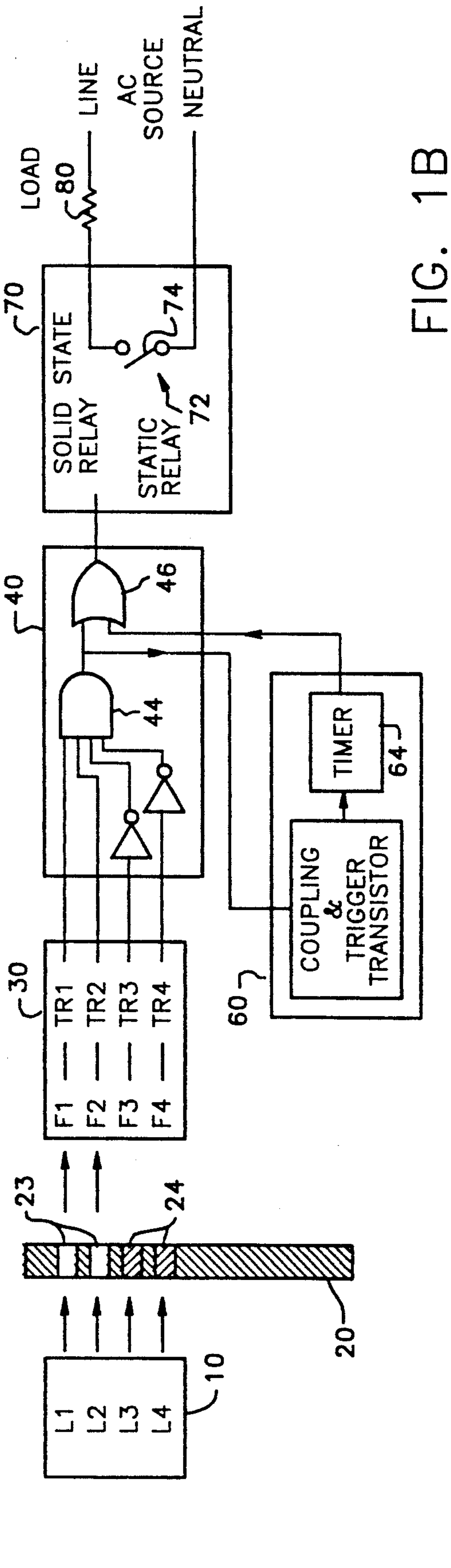

FIG. 1B is a more detailed embodiment of the invention depicted in FIG. 1A. Light transmission source 10 comprises four individual light sources L1–L4. In a preferred embodiment, these light sources L1–L4 are light emitting diodes. Photoelectric receiving circuit 30 comprises four photoresistors F1–F4, each of said photoresistors is coupled to a transistor TR1–TR4, respectively. Each photoresistor F1–F4 emits an open transistor signal when it receives no light from its respective light source L1–L4. Each photoresistor F1–F4 emits a close transistor signal when it receives light from its respective individual light source L1–L4. The output of each transistor TR1–TR4 is a logic state 1 in response to an open transistor signal from its respective photoresistor F1–F4, and a logic state 0 in response to a close transistor signal from its respective photoresistor F1–F4.

Gating circuit 40 receives a combination of output signals from transistors TR1–TR4. The outputs of transistors TR1 and TR2 are fed directly into AND gate 44. The outputs of transistors TR3 and TR4 are fed directly into NOT gates 42. The outputs from NOT gates 42 are fed directly into AND gate 44. The output of AND gate 44 is fed into OR gate 46 and into time delay circuit 60. Gates 42, 44, and 46 of gating circuit 40 are arranged such that only one predetermined combination of output signals from transistors TR1–TR4 will cause gating circuit 40 to transmit a close circuit signal, and all remaining combinations of output signals from transistors TR1–TR4 will cause gating circuit 40 to transmit an open circuit signal. For the embodiment depicted in FIG. 1B, the one predetermined combination of output signals from transistors TR1–TR4 which will cause gating circuit 40 to transmit a close circuit signal is the following combination: TR1 and TR2 transmitting a logic state 1 output signal; and TR3 and TR4 transmitting a logic state 0 output signal.

Transistors TR1–TR4 will transmit the aforesaid predetermined combination of output signals when photoresistors F1 and F2 receive no light from their respective light sources L1 and L2, and when photoresistors F3 and F4 receive light from their respective light sources, L3 and L4. In the embodiment depicted in FIG. 1B, the multiplicity of translucent regions 24 and nontranslucent regions 23 on photoelectric switching card 20 are arranged such that when photoelectric switching card is inserted between light transmission source 10 and photoelectric receiving circuit 30, photoresistors F1 and F2 receive no light, and photoresistors F3 and F4 receive light, thereby causing a close circuit signal to be transmitted by gating circuit 40.

The output from AND gate 44 which feeds into time delay circuit 60, is received by coupling and trigger transistor TR5. When the output of AND gate 44 is a logic state 1, coupling and trigger transistor TR5 actuates timer 64 which delivers a time delay signal to the input of OR gate 46. This time delay signal delays gating circuit 40 from transmitting an open circuit signal to power switch 70 for a predetermined time period.

Power switch 70 comprises static relay 72, which is coupled to load switch 74. In response to an open circuit signal from gating circuit 40, static relay 72 is deactivated, thereby opening load switch 74. In this configuration, loads 80 are deenergized. In response to a close circuit signal from gating circuit 40, static relay 72 is activated, and load switch 74 is closed, thereby energizing loads 80.

Figure 2:
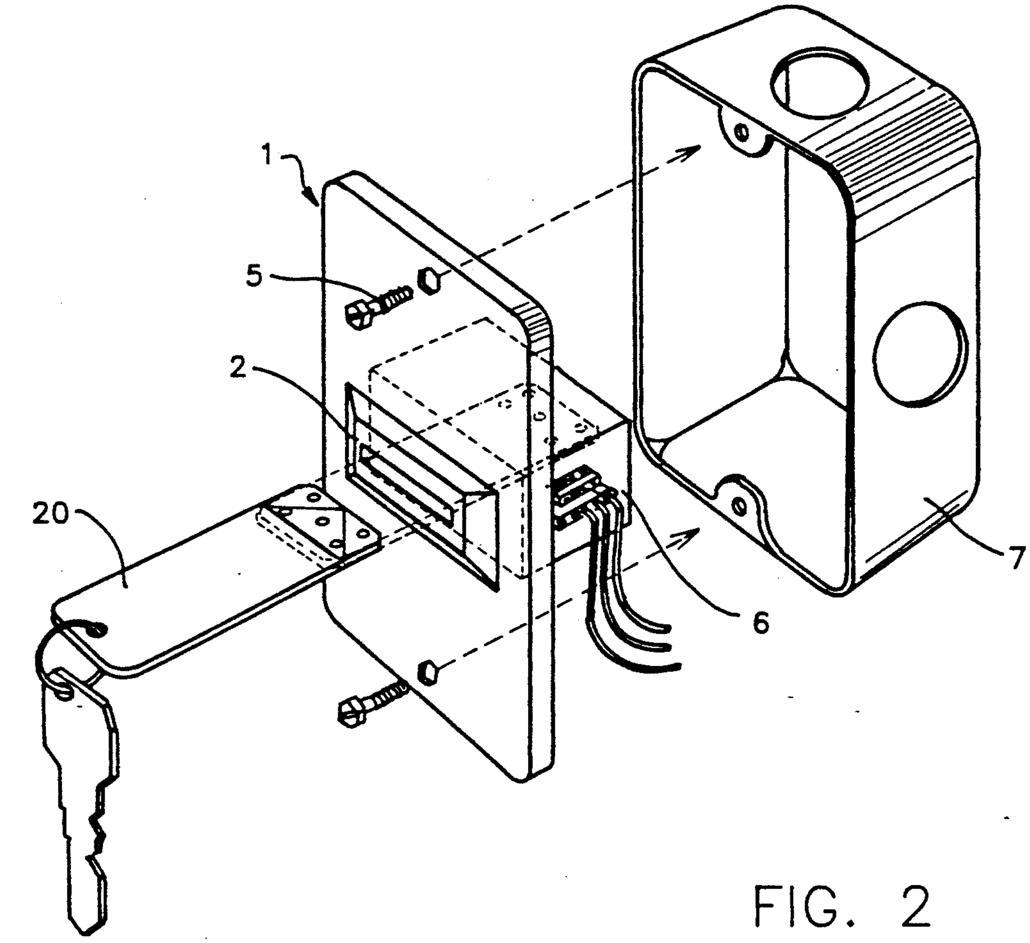
FIG. 2 is an exploded isometric view of the card switching box and photoelectric switching card.

In a preferred embodiment, light transmission source 10, photoelectric receiving circuit 30, and gating circuit 40 are housed in a card switching box 7. Referring to FIG. 2, an exploded isometric view of card switching box 7 and photoelectric switching card 20 is shown. Card switching box 7 comprises face plate 1 having a receiving slit 2 through which photoelectric switching card 20 is removably insertable between light transmission source 10 and photoelectric receiving circuit 30. Face plate 1 is secured to the body of card switching box 7 with two screws 5. Card switching box 7 is equivalent in size to conventional wall switch boxes.

Figure 3:
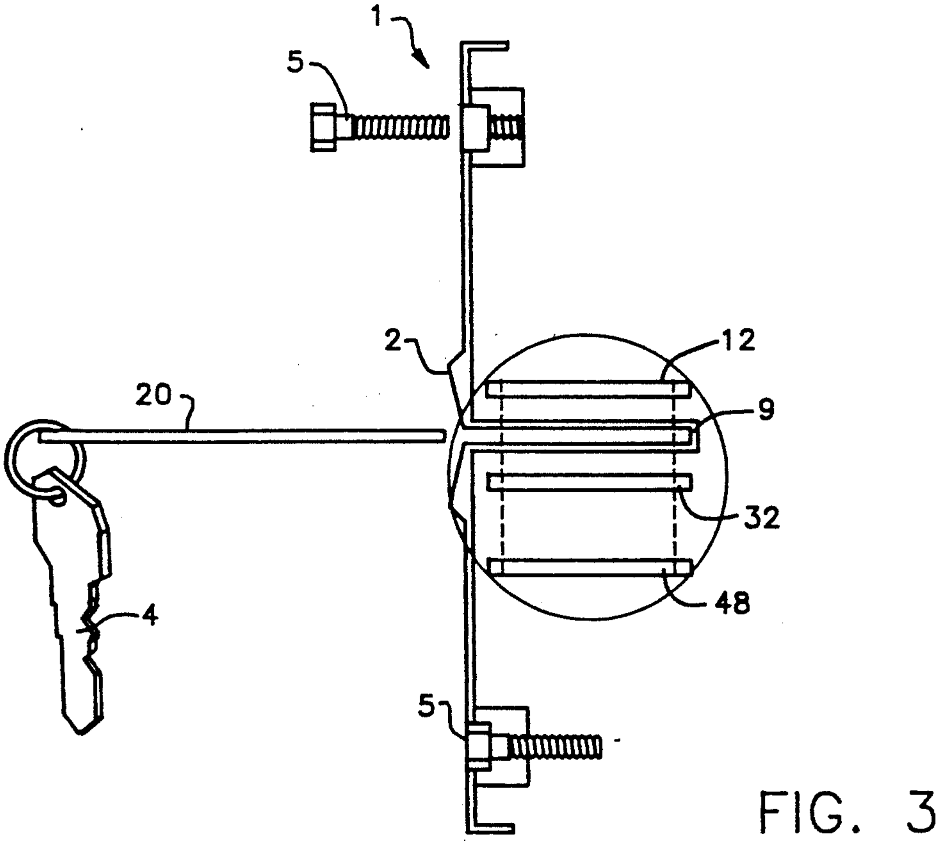
FIG. 3 is a cutaway side view of the card switching box and circuit housing.

In a preferred embodiment, light transmission source 10 is a light transmission circuit mounted on planar circuit board 12. In a preferred embodiment, photoelectric receiving circuit 30 and gating circuit 40 are also mounted on planar circuit boards 32 and 48, respectively, as shown in FIG. 3. Planar circuit boards 12, 32, and 48 are mounted in horizontal planes such that light transmission circuit 12 is mounted above photoelectric receiving circuit 32, and gating circuit 48 is mounted below photoelectric receiving circuit 32. Planar circuits 12, 32, and 48 are housed in circuit board housing 6 attached to the inside of face plate 1, as shown in FIG. 2.

Photoelectric switching card guides 9, mounted on the inside of face plate 1 and contained in circuit board housing 6, are planar guides which establish the predetermined location where photoelectric switching card 20 is inserted in the path of light beams emitted by light sources from light transmission source 10.

Figure 4:
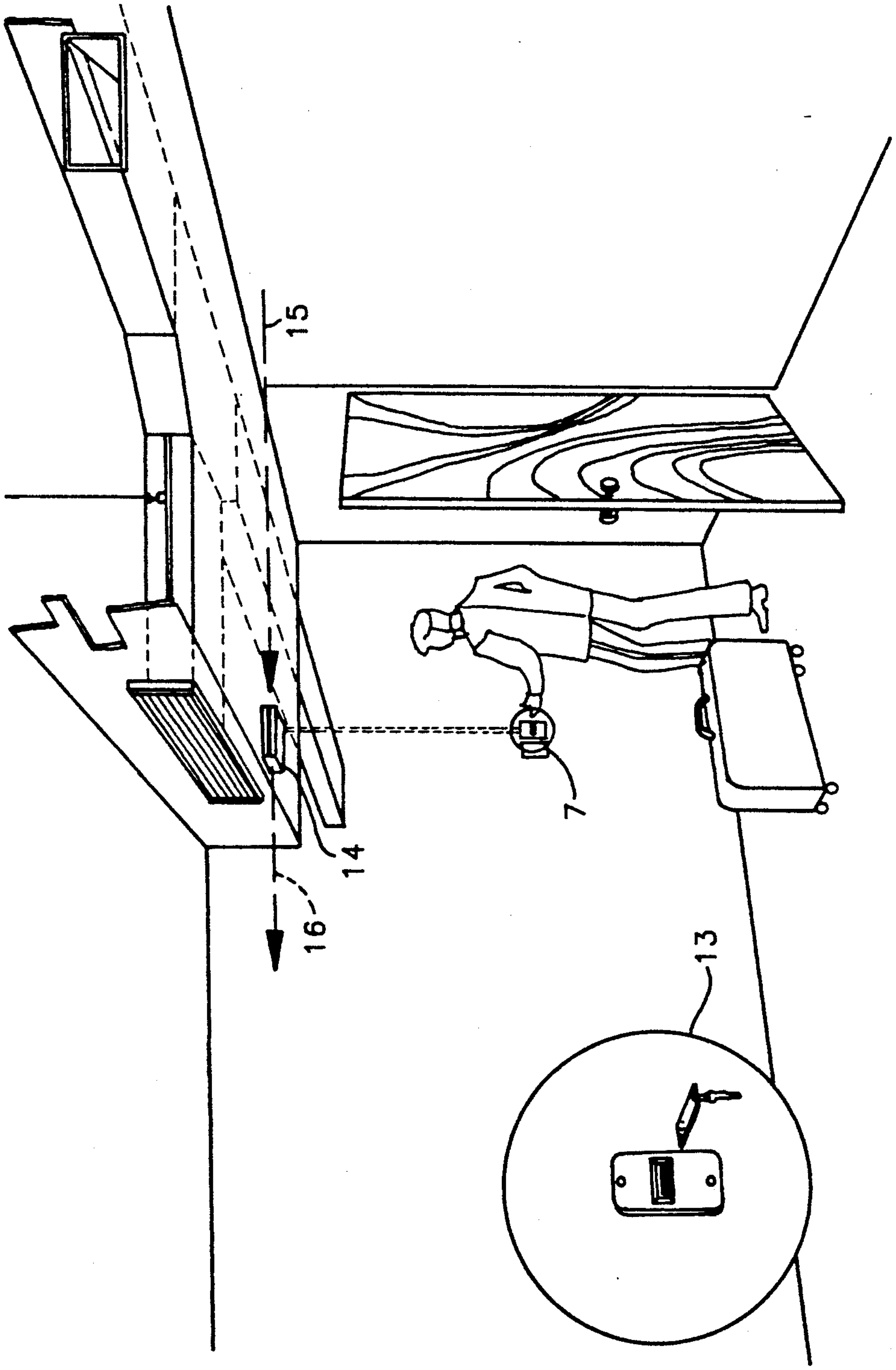
FIG. 4 is a diagram of the energy saving, optoelectronic system installed in a hotel room.

A diagram of the energy saving, optoelectronic system installed in a hotel room is shown in FIG. 4. Card switching box 7 is mounted on the wall conveniently located to the door of the room or building in which the energy saving, optoelectronic system is installed. Power switch 70 is mounted in power switch box 14. In a preferred embodiment, power switch box 14 is mounted outside the view of the normal room user, such as above the dropped ceiling which is present in many rooms. Electrical loads 80 are fed into power switch 70 via electrical load line 15. The electrical output from power switch 70 is transmitted on output load line 16. An enlarged view of face plate 7 and photoelectric switching card 20 is shown in region 13 of FIG. 4.

Figure 8:
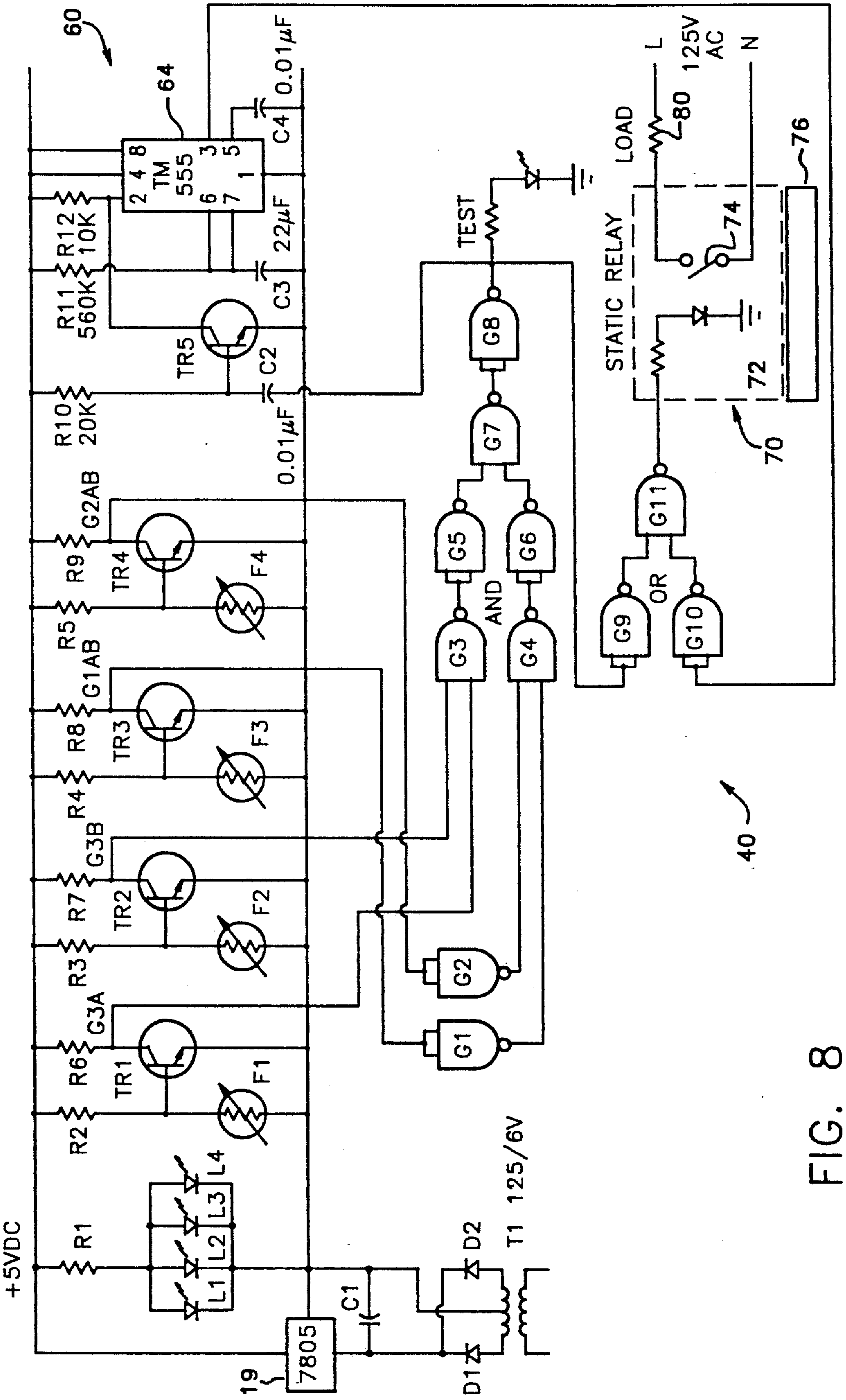
FIG. 8 is a combined schematic of the light transmission circuit, photoelectric receiving circuit, gating circuit, time delay circuit, and power switch.

A preferred embodiment of power switch 70, as contained in power switch box 14, is shown in FIG. 8. Relay 72 is a solid state relay mechanically coupled to an aluminum heat sink 76 such that thermal energy is transferred from relay 72 to heat sink 76 whenever the relay heats up.

Figure 5:
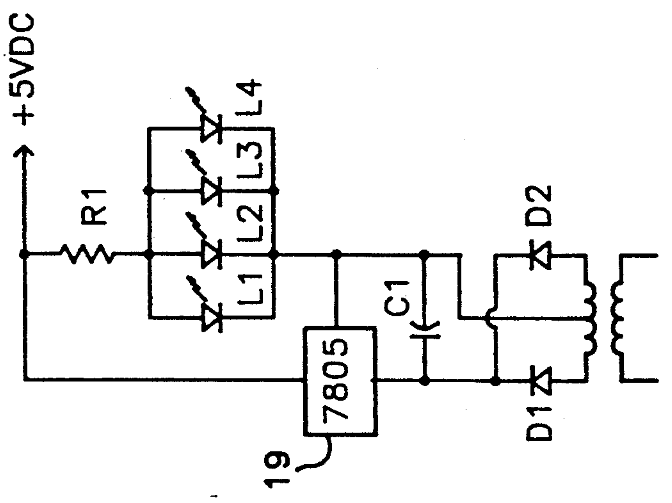
FIG. 5 is a schematic of the light transmission circuit.

A preferred embodiment of light transmission source 10 which is mounted on planar circuit board 12 is depicted in FIG. 5. Diodes D1 and D2 serve to provide a DC voltage input into voltage regulator 19. In a preferred embodiment, voltage regulator 19 is a Model No. 7805 voltage regulator, which delivers an output of 5 volts. Resistor R1 is a 220 ohm resistor coupled in series to light emitting diodes L1–L4.

Figure 6:
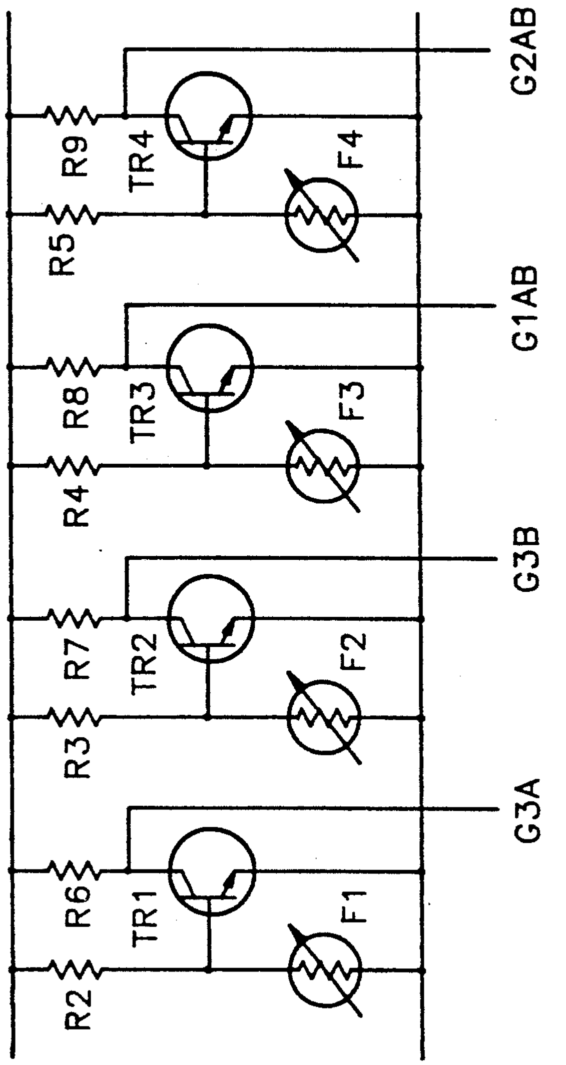
FIG. 6 is a schematic of the photoelectric receiving circuit.

A preferred embodiment of photoelectric receiving circuit 30 is depicted in FIG. 6. Resistors R2–R5 function as voltage dividers which are connected in series with photoresistors F1–F4, respectively. In a preferred embodiment, resistors R2–R5 provide a fixed resistance of 560 kiloohms. Resistor R6 is of a sufficient resistance such that when transistor TR1 is open circuited, the voltage at the collector is approximately 5 volts which corresponds to a logic state 1, and when transistor TR1 is close circuited, the voltage at the collector is approximately 0.3 volts which corresponds to a logic state 0. Resistors R7–R9 operate in the same fashion with respect to transistors TR2–TR4, respectively.

Figure 7:
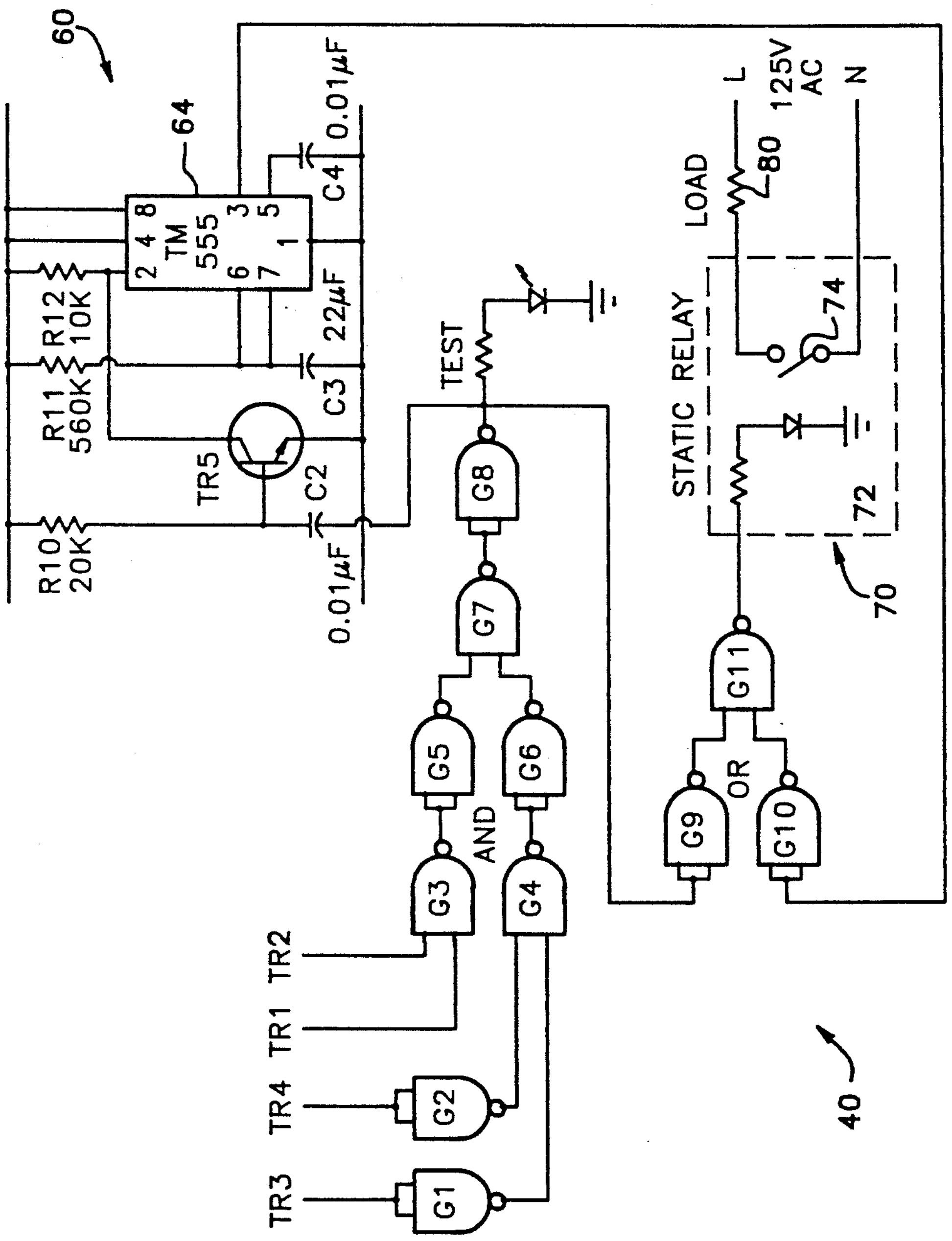
FIG. 7 is a schematic of a preferred embodiment of the gating circuit, time delay circuit, power switch, and loads.

A preferred embodiment of gating circuit 40, time delay circuit 60, power switch 70 and loads 80 are depicted in FIG. 7. NAND gates G1–G8 are configured to receive input from transistors TR1–TR4 such that gating circuit 40 transmits a close circuit signal in response to only one predetermined combination of transistor output signals from transistors TR1–TR4. That one predetermined combination of transistor output signals occurs when TR1 and TR2 transmit a logic state 1 and TR3 and TR4 transmit a logic state 0. In response to this one predetermined combination of output signals from transistors TR1–TR4, the output of NAND gate G8 is a logic state 1. This output state at NAND gate G8 causes coupling and trigger transistor TR5 to trigger timer 64. Timer 64 sends a delay signal to NAND gates G10 and G11, thereby preventing gating circuit 40 from transmitting a close circuit signal to power switch 70 for a predetermined time period. In a preferred embodiment, this predetermined time period is 23 seconds.

FIG. 8 is a preferred embodiment of light transmission source 10, photoelectric receiving circuit 30, time delay circuit 60, gating circuit 40, power switch 70, and loads 80, coupled together to form the energy saving, optoelectronic system of the present invention. The resistance of resistors and capacitance of each capacitor for this preferred embodiment are also depicted in FIG. 8.

Many modifications and variations may be made in the embodiments described herein and depicted in the accompanying drawings without departing from the concept of the present invention. Accordingly, it is clearly understood that the embodiments described and illustrated herein are illustrative only and are not intended as a limitation upon the scope of the present invention.

What is claimed is:

1. An energy saving, optoelectronic system for energizing and deenergizing electrical loads, comprising:

(a) a light transmission source emitting a continuous light signal;

(b) a photoelectric receiving circuit placed to a receive a continuous light signal from said light transmission source, and to transmit a first output signal or a second output signal in response to the particular light signal received from said light transmission source; .

(c) photoelectric switching card removably insertable between said light transmission source and said receiving circuit, such that when said switching card is not inserted, said receiving circuit receives an unabbreviated light signal from said light transmission source and transmits a first output signal, and when said switching card is inserted, said receiving circuit receives a predetermined, unique, abbreviated light signal from said light source and transmits a second output signal;

(d) a gating circuit coupled to receive output signals from said receiving circuit such that said gating circuit transmits an open circuit signal in response to a first output signal and transmits a close circuit signal in response to a second output signal, the gating circuit comprising NOT gates arranged such that the receiving circuit will transmit the second output signal upon receiving the predetermined light signal; and (e) a power switch coupled to said gating circuit such that said power switch is open in response to an open circuit signal from said gating circuit and said power switch is closed in response to a close circuit signal from said gating circuit.

2. The energy saving, optoelectronic system of claim 1 further comprising a time delay circuit coupled to said gating circuit such that when said switching card is removed from between said light source and said receiving circuit, said time delay circuit transmits a delay signal to said gating circuit which delays said gating circuit from transmitting an open circuit signal to said power switch for a predetermined time period.

3. The energy saving, optoelectronic system of claim 1 wherein said light transmission source comprises a multiplicity of individual light sources arranged in a predetermined geometric pattern.

4. The energy saving, optoelectronic system of claim 3 wherein said photoelectric receiving circuit comprises:

(a) a multiplicity of photoresistors, each of said photoresistors positioned to receive a light signal from one of said individual light sources such that each of said photoresistors emits an open transistor signal when it receives no light from said individual light source and emits a close transistor signal when it receives light from said individual light source; and (b) a multiplicity of transistors, each of said transistors coupled to each of said photoresistors, such that the output of each of said transistors is a logic state 1 in response to an open transistor signal and a logic state 0 in response to a close transistor signal.

5. The energy saving, optoelectronic system of claim 4 wherein said gating circuit comprises a multiplicity of gates arranged to receive output signals from each of said transistors such that only one predetermined combination of output signals from said transistors will cause said gating circuit to transmit a close circuit signal and all remaining combinations of output signals from said transistors will cause said gating circuit to transmit an open circuit signal.

6. The energy saving, optoelectronic system of claim 3 wherein said photoelectric switching card comprises a predetermined geometric pattern of translucent and nontranslucent regions such that when said switching card is inserted between said light transmission source and said photoelectric receiving circuit, a predetermined, unique geometric pattern of light from preselected individual light sources is received by said receiving circuit.

7. The energy saving, optoelectronic system of claim 5 wherein said photoelectric switching card comprises a predetermined geometric pattern of translucent and nontranslucent regions such that when said switching card is inserted between said light source and said photoelectric receiving circuit, a predetermined, unique combination of output signals is transmitted by said transistors.

8. The energy saving, optoelectronic system of claim 1 wherein said power switch comprises:

(a) a solid state relay coupled to said gating circuit such that said relay is activated in response to a close circuit signal from said gating circuit and said relay is deactivated in response to an open circuit signal from said gating circuit;

(b) an aluminum heat sink mechanically coupled to said relay such that thermal energy is transferred from said relay to said aluminum heat sink whenever said relay heats up; and (c) an electric load switch coupled to said relay such that said electrical load switch closes when said relay is activated and opens when said relay is deactivated.

9. The energy saving, optoelectronic system of claim 8 further comprising electrical loads coupled to said electrical load switch such that when said electrical load switch is opened, said electrical loads are deenergized and when said electrical load switch is closed, said electrical loads are energized.

10. The energy saving, optoelectronic system of claim 1 wherein said light transmission source, said photoelectric receiving circuit, and said gating circuit are housed in a card switching box equivalent in size to conventional wall switch boxes.

11. The energy saving, optoelectronic system of claim 10 wherein said light transmission source, said photoelectric receiving circuit, and said gating circuit are each mounted on a planar circuit board.

12. The energy saving, optoelectronic system of claim 11 wherein each of said planar circuit boards is mounted within said card switching box.

13. The energy saving, optoelectronic system of claim 12 wherein said card switching box comprises a face plate having a card receiving slit through which said photoelectric switching card is removably insertable between said light transmission source and said photoelectric receiving circuit.

14. An energy saving, optoelectronic system for energizing and deenergizing electrical loads in a building, comprising;

(a) a light transmission circuit comprising a multiplicity of continuous light sources arranged in a predetermined geometric pattern, each of said light sources emitting an individual light beam such that said light sources collectively transmit a predetermined light emission pattern;

(b) a photoelectric switching card comprising a multiplicity of translucent and nontranslucent regions arranged in a predetermined geometric pattern such that when said switching card is inserted in a predetermined location in the path of light beams emitted by said light sources, a predetermined abbreviated light emission pattern passes through said switching card;

(c) a photoelectric receiving circuit placed to receive a continuous light emission pattern from said light sources such that when an unabbreviated light emission pattern is received, said receiving circuit transmits a first output signal and when a predetermined abbreviated continuous light emission pattern is received, said receiving circuit transmits a second output signal;

(d) a gating circuit coupled to receive output signals from said receiving circuit such that said gating circuit transmits an open circuit signal in response to a first output signal and transmits a close circuit signal in response to a second output signal, the gating circuit comprising NOT gates arranged such that the receiving circuit will transmit the second output signal upon receiving the predetermined light signal; and (e) a power switch coupled to said gating circuit such that said power switch is opened in response to an open circuit signal from said gating circuit and said power switch is closed in response to a close circuit signal from said gating circuit.

15. The energy saving, optoelectronic system of claim 14 further comprising a time delay circuit coupled to said gating circuit such that when said switching card is removed from between said light source and said receiving circuit, said time delay circuit transmits a delay signal to said gating circuit which delays said gating circuit from transmitting an open circuit signal to said power switch for a predetermined time period.

16. The energy saving, optoelectronic system of claim 15 wherein said light sources are light emitting diodes.

17. The energy saving, optoelectronic system of claim 14 wherein said photoelectric receiving circuit comprises a multiplicity of transistors, each of said transistors producing an output signal in response to the light emission pattern received from said light emission sources, such that said transistors transmit a predetermined combination of output signals only in response to a predetermined abbreviated light emission pattern.

18. The energy saving, optoelectronic system of claim 14 wherein said light transmission circuit, said photoelectric receiving circuit, and said gating circuit are each mounted on a planar circuit board.

19. The energy saving, optoelectronic system of claim 18 wherein each of said circuit boards are mounted in horizontal planes such that said light transmission circuit is mounted above said photoelectric receiving circuit and said gating circuit is mounted below said photoelectric receiving circuit.

20. The energy saving, optoelectronic system of claim 19 wherein said planar circuit boards are housed in a card switching box equivalent in size to conventional wall switch boxes.

21. The energy saving, optoelectronic system of claim 20 wherein said card switching box comprises a face plate having a receiving slit through which said photoelectric switching card is removably insertable in a horizontal plane between said light transmission circuit and said photoelectric receiving circuit.

22. An energy saving, optoelectronic system for energizing and deenergizing electrical loads in a hotel, comprising:

(a) a light transmission circuit mounted on a planar circuit board comprising a multiplicity of light emitting diodes arranged in a predetermined geometric pattern, each of said light emitting diodes emitting an individual continuous light beam such that said light emitting diodes collectively transmit a light emission pattern;

(b) a photoelectric switching card equivalent in size to a conventional credit card, said photoelectric switching card comprising a multiplicity of translucent and nontranslucent regions arranged in a predetermined geometric pattern such that when said switching card is inserted in a predetermined location in the path of light emitted by said light emitting diodes, a predetermined abbreviated light emission pattern passes through said switching card;

(c) a photoelectric receiving circuit mounted on a planar circuit board, said photoelectric receiving circuit placed to received a continuous light emission pattern from said light emitting diodes such that when an unabbreviated continuous light emission pattern is received, said receiving circuit transmits a first output signal and when a predetermined abbreviated continuous light emission pattern is received, said receiving circuit transmits a second output signal;

(d) a gating circuit mounted on a planar circuit board, said gating circuit coupled to receive output signals from said receiving circuit such that said gating circuit transmits an open circuit signal in response to a first output signal and transmits a close circuit signal in response to a second output signal, the gating circuit comprising NOT gates arranged such that the receiving circuit will transmit the second output signal upon receiving the predetermined light signal;

(e) a power switch coupled to said gating circuit such that said power switch is opened in response to an open circuit signal from said gating circuit and said power switch is closed in response to a close circuit signal from said gating circuit; and (f) a time delay circuit coupled to said gating circuit such that when said switching card is removed from between said light transmission circuit and said receiving circuit, said time delay circuit transmits a delay signal to said gating circuit which delays said gating circuit from transmitting an open circuit signal to said power switch for a predetermined time period.

* * * * *